Dec. 16, 1969     R. F. SCHMOOCK ET AL     3,484,593
APPARATUS TO PERFORM INTEGRATION OR INTEGRATION
AND SQUARE ROOT EXTRACTION
Filed May 19, 1966

United States Patent Office 3,484,593
Patented Dec. 16, 1969

3,484,593
APPARATUS TO PERFORM INTEGRATION OR INTEGRATION AND SQUARE ROOT EXTRACTION
Roy F. Schmoock, Ivyland, Peter W. Guenther, Southampton, and Peter S. Levesque, Warminster, Pa., assignors to Fischer & Porter Company, Warminster, Pa., a corporation of Pennsylvania
Filed May 19, 1966, Ser. No. 551,421
Int. Cl. G06g 7/18, 7/20
U.S. Cl. 235—183   9 Claims

ABSTRACT OF THE DISCLOSURE

An electrical integrator for fluid flow measurement comprises a pair of conventional electronic integrating circuits connected in series. Continuous operation is accomplished by reversing the polarity of the input signal to the first integrating circuit whenever the output of the second integrating circuit reaches a predetermined upper or lower limit. The output of the second integrating circuit is clamped so that it cannot exceed the upper predetermined limit or fall below the lower predetermined limit.

---

This invention relates to integrators, and particularly to integrators of a type suitable for providing, over an extended period of time, an output which is proportional to a variable where the input is proportional to the time rate of change of the variable or to some function of the time rate of change of that variable.

For example, the invention is suitable for use in conjunction with any type of flowmeter which provides an electrical signal as an output where the amplitude of the electrical signal is proportional to the rate of flow. A form of the invention is suitable for use in conjunction with a flow rate measuring device of a common type which comprises a differential pressure measuring apparatus which provides an electrical signal at its output the amplitude of which is proportional to the square of the flow rate. Two forms of the invention will be described, one of which performs the operation of integration and the other of which performs the operation of integration and simultaneously extracts the square root of the input signal.

In brief, the invention is an apparatus in which integrating circuits of the type used in analogue computers are adapted to integrate over long periods of time, for example, over hours, day or weeks or even longer. An electronic integrating circuit of the usual type comprises a high-gain D.C. amplifier provided with a capacitor connected between its output and its input and a resistor connected between the input signal of the integrator and the input of the amplifier. Such integrating circuits are conventional and need not be described in detail. An elementary analysis will show that the voltage appearing at the output of the amplifier is proportional to the integral of the input voltage with respect to time. Obviously, such integrators are limited to use in performing integrations only over short periods of time and are, by themselves, incapable of providing, for example, an indication of a total quantity of flow over an extended period of time.

The primary object of this invention is to provide a simple electronic integrating apparatus which is capable of producing a highly accurate output over extended periods of time.

Another object is to provide an apparatus which simultaneously performs the operations of integration and square root extraction.

Still another object is to provide an integrator in which the accumulation of error is minimized.

Other objects will become apparent from the following description read in conjunction with the accompanying drawings in which.

For a better understanding of the various specific details invloved in the forms of the invention to be described, it will be helpful to discuss the theory involved in the overall operation of the integrating circuits.

Figure 2:
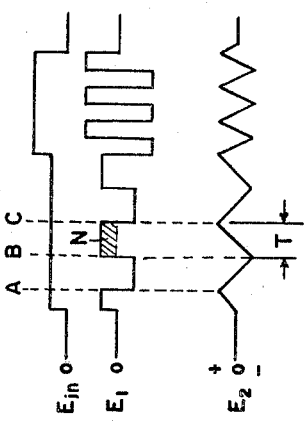
FIGURE 2 is a diagram illustrating the operation of the apparatus shown in FIGURE 1.

The output of both forms of the invention is in the form of a count which may be displayed on an electrical or mechanical counter, the number of counts being proportional to the integral of the input signal or to the integral of the square root of the input signal. Referring to FIGURE 2, an input voltage signal $E_{in}$ is shown, arbitrarily varying between three levels beginning at zero. From the beginning until point A in time, $E_1$ is equal to or proportional to $E_{in}$. From the beginning to point A, $E_2$ represents the integral of $E_1$. When $E_2$ reaches a certain predetermined level, at time A, the polarity of $E_1$ is reversed and $E_2$ decreases until it reaches a predetermined minimum level at time B whereupon the polarity of $E_1$ is again reversed. A polarity reversal occurs still another time when $E_2$ reaches its upper limit and point C is thus determined. The shaded area N of $E_1$ is equal to the excursion of $E_2$ between points B and C. Thus, each polarity reversal precisely represents a fixed quantity proportional to the integral of $E_1$ from time B to time C and etc., independent of any time variance of $E_{in}$. By totalizing these reversals on a counter the integral of the input over indefinitely long time periods is obtained.

Figure 1:
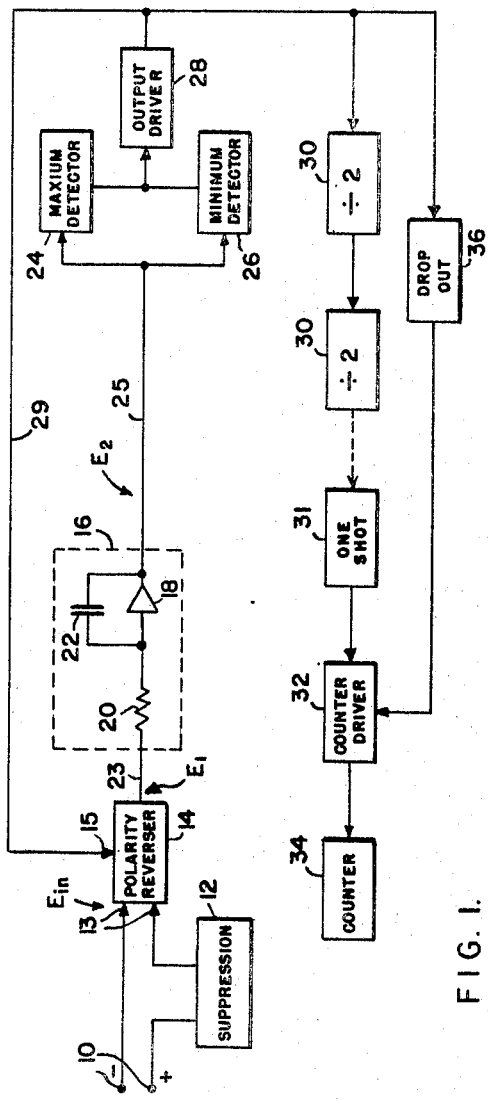
FIGURE 1 is a block diagram showing in general the various parts of an integrating apparatus in accordance with the invention.

The operations illustrated in FIGURE 2 can be performed by the apparatus illustrated diagrammatically in FIGURE 1, which shows a pair of input terminals 10 to which a signal corresponding to the variable to be integrated is applied. A suppression circuit 12 is provided in the positive line in order to debias the input where the range of voltages appearing at terminal 10 is not such that a zero voltage corresponds to a zero value of the variable to be integrated. This is commonly the case with transducers of the type which provide an output in the form of a current. The value of the current may range typically from 4 ma. for a zero value of the input of a 20 ma. as a maximum. The biasing voltage supplied by suppression circuit 12 is such that the signal applied to terminals 13 is zero-based, that is, a zero value of the variable produces a zero voltage across terimals 13. The voltage across terminals 13 is $E_{in}$. A polarity reversing circuit 14 is provided to receive the signal at terminals 13 and to reverse its polarity in response to a control signal applied to terminal 15. The output of the polarity reversing circuit is applied to the input of an integrating circuit 16 which is shown comprising its essential parts including a high-gain D.C. amplifier 18 which receives the output of the polarity reverser 14 through a resistor 20. A feedback capacitor 22 connects the output of amplifier 18 with its input so that the signal from capacitor 22 is added to the signal applied to the amplifier through resistor 20. The resultant configuration is generally described as an integrating amplifier. The voltage appearing in line 23 at the output of the polarity reversing circuit is $E_1$. The voltage appearing at the output of the integrator in line 25 is $E_2$.

A maximum detector 24 and a minimum detector 26 are provided to receive the output of the integrator, and are essentially triggering devices which provide an output signal when their input signal reaches predetermined limits. For example, when $E_2$ reaches a predetermined positive value (see FIGURE 2), maximum detector 24 delivers a signal to a bistable output driver 28. Likewise, when $E_2$ reaches a predetermined negative value, minimum detector 26 delivers a signal to the input of output driver 28. Output driver 28 is essentially a bistable circuit which changes its state each time it receives an input signal from either of detectors 24 or 26. A feedback path is provided at 29, through which the condition of the output driver effects the operation of the polarity reverser 14. The relationship between the states of output driver 28 and the polarity of $E_1$ in line 23 is such that one state of driver 28 produces a positive signal in line 23, and the opposite state produces a negative signal in line 23, both proportional to the input at 13. The output driver and polarity reverser will be described in detail with reference to FIGURE 5, later in this description.

The signal produced by the output driver can be counted to represent the integral of the input signal. A series of cascaded binary flip-flops 30 is provided to reduce the frequency of pulses produced by output driver 28 so that the pulses can be counted by a mechanical counter 34. A one-shot multivibrator 31 receives the output of the last flip-flop 30. A counter driver 32, which is an amplifier, delivers the output of one-shot 31 in a form suitable for operating an electro-mechanical counter.

When the variable to be integrated is actually at a zero value, there may be some residual input to the system which could cause the output voltage of the integrator to build up and finally cause a count to be registered. This would result in an error in the indication of the integrator. It is therefore desirable to establish a "dropout" level with respect to the voltage at terminals 13. If the signal at terminal 13 falls below this level, the counter 34 should not respond. Disabling of the counter is accomplished by the provision of a frequency responsive dropout circuit 36, which receives control pulses from output driver 28, and which disables counter driver 32 whenever the frequency of the output of driver 28 falls below a level determined by the parameters of the dropout circuit 36. The dropout level is desirably adjustable. Its operation will become clear from a subsequent description with reference to the details of its circuitry.

Figure 4:
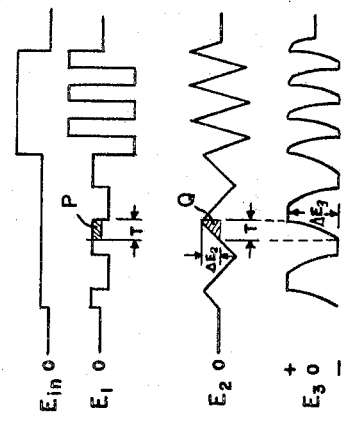
FIGURE 4 is a diagram illustrating the operation of the apparatus shown in FIGURE 3.

The operations involved in the simultaneous extraction of a square root and integration are illustrated diagrammatically in FIGURE 4, in which $E_{in}$ is a voltage which is proportional to the square of a variable to be integrated. Again, the polarity of $E_{in}$ is reversed to produce $E_1$, but the times at which the reversal occurs are determined by the time required for the excursion of a voltage $E_3$ between two different predetermined levels. The difference between these two levels is $\Delta E_3$ volts.

$E_2$ is the integral of $E_1$, and no limit is placed on the excursion of $E_2$. $E_3$ is the integral of $E_2$ when $E_2$ is moving away from zero volts, $E_3$ being held at either the positive or negative limit when $E_2$ is moving toward zero volts.

Considering the interval T, the shaded area P is equal to $E_1T$ over that interval. Since $E_2$ is the integral of $E_1$:

$$\Delta E_2 = E_1 T$$

The shaded area Q is $$\frac{\Delta E_2 T}{2}$$

since it is triangular and:

$$\Delta E_3 = \frac{\Delta E_2 T}{2}$$

Combining the above equations and solving for $\Delta E_3$, we have:

$$\Delta E_3 = \frac{T^2 E_1}{2}$$

Since $\Delta E_3$ is a constant determined by the limits of the excursion of $E_3$, $$\frac{1}{T} \propto \sqrt{E_1}$$

Since the frequency of the reversals is proportional to $1/T$, the counting rate is proportional to $\sqrt{E_{in}}$, and the count is proportional to the integral of the square root of $E_{in}$.

Figure 3:
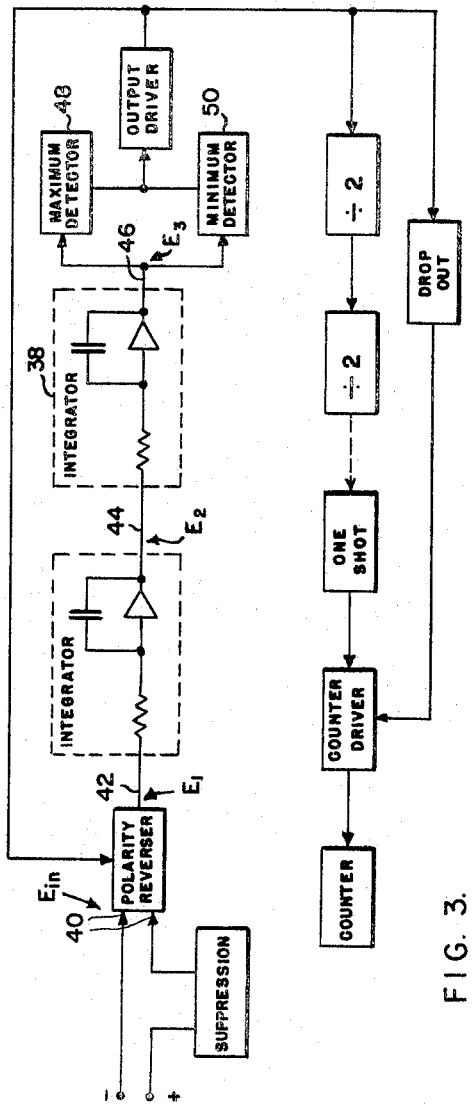
FIGURE 3 is a block diagram of an apparatus in accordance with the invention which performs the operations of integration and square root extraction.

An apparatus which is capable of performing the operations illustrated in FIGURE 4 is shown diagrammatically in FIGURE 3. It will be noted that the only difference between FIGURES 1 and 3 is that in FIGURE 3 a second integrator 38 is connected in series with the first integrator. $E_{in}$ appears at terminals 40. $E_1$ appears at the output line 42 of the polarity reverser. $E_2$ appears in line 44 at the output of the first integrator, and $E_3$ appears in line 46 at the output of integrator 38. The maximum and minimum detectors 48 and 50 establish the positive and negative limits of $E_3$ so that the level of $E_3$ determines the times at which polarity reversal occurs.

Figure 5:
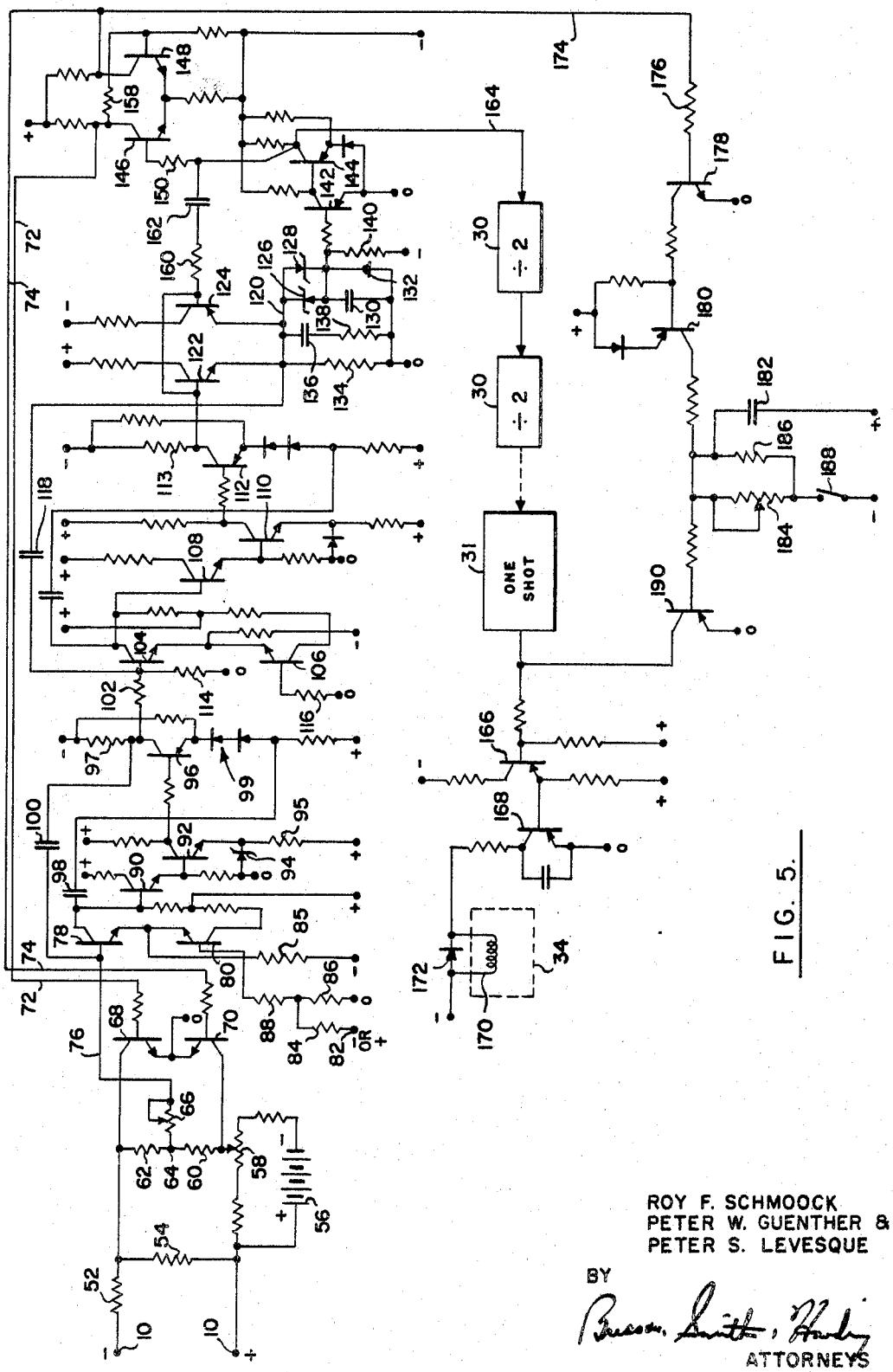
FIGURE 5 is a schematic diagram illustrating the details of a circuit corresponding to the apparatus shown in the diagram of FIGURE 3.

The means by which $E_3$ is held at its limit value while $E_2$ moves toward zero volts is not shown in FIGURE 3, but will become clear from the following description with reference to FIGURE 5 which illustrates the details of the circuit involving two integrators. The details of the circuit involving one integrator are not illustrated since it will be apparent that the two modifications are almost exactly the same except for the inclusion of the second integrator for performing the operation of square root extraction.

Referring to FIGURE 5, a pair of input terminals 10 are shown which are provided to receive an input in the form of an electrical current which passes primarily through resistors 52 and 54 to establish a voltage across resistor 54. This arrangement is particularly adaptable to current transmitting devices which change resistance in response to the variable. The sensing device may be remote, and there may be provided a direct current power supply in series with resistor 52 at the location of the integrating circuit, and only two wires are needed for the connection to the remote sensing device. Suitable sensing devices, of course, need not be of the current transmitter type, and they may be of a self-contained type providing an output voltage, thus eliminating the need for resistors 52 and 54.

In FIGURE 5, terminals marked + and − indicate connection to positive and negative supply terminals respectively, and terminals marked 0 are common connections to a supply terminal at a voltage intermediate the voltages at the positive and negative supply terminals.

A voltage source 56 is shown in the form of a battery, although it will be apparent that a more practical voltage source might be in the form of a well-regulated direct current power supply. Source 56 is shunted by a series voltage dropping network including potentiometer 58, the movable arm of which is connected through resistors 60 and 62 to one terminal of resistor 54. The positive terminal of source 56 is connected to the other terminal of resistor 54, the circuit including the voltage dropping network and source 56 provides an adjustable biasing voltage in series with the voltage appearing across resistor 54. The biasing voltage, as mentioned previously, may be necessary so that the voltage appearing across resistors 60 and 62 is zero when the variable to be integrated is at a zero value.

The input to the first integrator is taken from the junction 64 of resistors 60 and 62 through a variable resistor 66. A pair of transistors 68 and 70 in opposed relationship and having their emitters connected to a common connection are provided. Their collectors are connected respectively to the ends of resistors 62 and 60 opposite junction 64. Transistors 68 and 70 are controlled through their bases by signals from line 72 and 74 so that either one may be made conductive while the other remains non-conductive.

Since the voltage across resistors 60 and 62 is zero-based because of the provision of the suppression circuit including source 56, the polarity of the signal (with respect to the common connection) applied to the input of the first integrator through resistor 66 and line 76 may be reversed by causing transistor 68 to conduct while transistor 70 becomes non-conductive or vice versa. If the voltage at the collector of transistor 70, for example, is positive with respect to the voltage at the collector of transistor 68, the voltage at junction 64 and consequently the voltage line 76 will be negative with respect to common if transistor 70 is conducting and transistor 68 is non-conducting. If transistor 70 is non-conducting and transistor 68 is conducting, the voltage at junction 64 and in line 76 will be positive.

The output of the polarity reversing circuit is fed through line 76 to the base of transistor 78 which forms one input element of a differential amplifier including transistor 80 as its other input element. A balancing voltage is applied to the base of transistor 80 from a negative supply terminal 82 through a dropping network including resistors 84 and 86 and resistor 88. The parameters of this dropping network must be chosen in order to balance the differential amplifier, and it may be necessary to apply a positive rather than a negative voltage to the base of transistor 80 to achieve balance.

The output of the differential amplifier is derived from the collector of transistor 78 and is applied to the input of an emitter-follower comprising transistor 90. The output of the emitter-follower is amplified by transistor 92, and a Zener diode 94 is provided in order to maintain a constant potential at the emitter of transistor 92 by provision of current from a positive supply terminal through resistor 95. An amplifier comprising transistor 96 is provided to receive an input from the collector of transistor 92. Capacitor 98 is connected between the emitter circuit of transistor 96 and the base of transistor 90 in order to provide a degree of negative feedback to prevent oscillation.

Capacitor 100 is the main feedback element, and is connected between the collector of transistor 96 and the base of transistor 78, a collector load resistance being provided at 97. Biasing is provided by diodes 99. The voltage appearing at the collector of transistor 96 will be proportional to the integral of the voltage at junction 64 (the output of the polarity reversing circuit).

A second integrating circuit receives the output of the first integrating circuit through resistor 102 at the base of transistor 104. Transistors 104 and 106 constitute the input elements of a differential amplifier, the output of which elements is amplified by transistors 108, 110 and 112.

The two integrating circuits are nearly identical and only the differences need be mentioned. In the second integrator, a resistor 114 is connected between the base of transistor 104 and zero. Resistor 114 limits the input impedance to the operational amplifier when the amplifier is in the saturated condition. The base of transistor 106 is connected through resistor 116 to zero, no compensating voltage being required since the differential amplifier in the second integrator is self-balancing.

Feedback to the base of transistor 104 is obtained through capacitor 118 from line 120, which is the output of a bipolar emitter-follower comprising NPN transistor 122 and PNP transistor 124. The collector of transistor 112, having the load resistor 113, is connected directly to the bases of transistors 122 and 124. The collectors of transistors 122 and 124 are respectively positive and negative, and the emitters of the pair are connected together at line 120. The output of the bipolar emitter-follower is applied to a pair of temperature compensated Zener diodes 126 and 128 connected in parallel and in opposite directions to zero through the parallel combination of capacitor 130 and tunnel diode 132. It is the nature of temperature compensated zeners to conduct only in one direction. Between line 120 and zero there are connected load resistor 134 and the series combination of capacitor 136 and resistor 138. Capacitor 136 and resistor 138 are provided to reduce the high frequency gain of the emitter follower pair and act to stabilize the amplifier under transient conditions occurring when zeners 126 and 128 turn on and off.

Tunnel diode 132 is biased between its two stable states through resistor 140 which is connected to the negative supply. Zener diodes 126 and 128 establish the levels of the output of the second integrator at which polarity reversal occurs. Capacitor 130 prevents switching of tunnel diode 132 between its stable states as a result of noise "spikes" which might be present in the circuit.

Transistors 142 and 144 are arranged to operate as a switch so that when tunnel diode 132 is turned on, transistor 142 is cut off, and transistor 144 conducts so that the collector of transistor 144 becomes more positive. Transistor 144 acts as a buffer for transistor 142 to prevent switching transients from feeding back by reverse voltage transfer to the tunnel diode.

A pair of transistors 146 and 148 constitute a switch which receives an input at the base of transistor 146 from the collector of transistor 144 through resistor 150. The transistors 146 and 148 are suitably biased and a crossover is provided through resistor 158 connected from the collector of transistor 146 to the base of transistor 148 so that transistors 146 and 148 are always necessarily in opposite states. The switch provides two outputs, one from the collector of transistor 146, and the other from the collector of transistor 148. The outputs are fed respectively through lines 72 and 74 to the bases of transistors 68 and 70. Since only one of transistors 146 and 148 can conduct at any given time, only one of transistors 68 and 70 can conduct at one time. Positive feedback is provided from the collector of transistor 144 through the series combination of capacitor 162 and resistor 160 to the bases of transistor 122 and 124 in order to insure complete transfer of tunnel diode 132 to its alternate stable states.

The first of a plurality of bistable flip-flops 30 receives an input through line 164 from the collector of transistor 144. Flip-flops 30 can be of conventional design and need not be described in detail. The output of the last flip-flop 30 is delivered to the input of a one-shot multivibrator 31, which is provided to produce uniform output pulses in response to positive going excursions of the output of the last bistable flip-flop of the series.

The output of multivibrator 31 is delivered to a two-stage amplifier comprising transistor 166 in emitter-follower configuration and transistor 168. The output of transistor 168 drives an electromechanical counter 34 which comprises in part a solenoid 170. A diode 172 is provided in conventional fashion across solenoid 170 as a transient supressor.

It will be apparent that various other devices can be used in place of or in conjunction with counter 34 in order to indicate or make other use of the pulses received from the output of multivibrator 31.

Returning to the aspect of the number of flip-flops 30 necessary, it will be apparent that the number of flip-flops 30 determines the scale of counter 34. Several flip-flops 30 are desirable in the circuit since the frequency of the pulses in line 164 may be too high to drive an electromechanical counter directly.

An output from the collector of transistor 148 is delivered through line 174 and through resistor 176 to the base of transistor 178, which drives transistor 180. Transistor 180 acts as a switch which conducts whenever line 174 becomes positive.

A capacitor 182 is arranged to be charged through the parallel combination of variable resistor 184 and resistor 186 and through switch 188 when it is closed.

Transistor 190 is arranged to connect the output of multivibrator 31 to zero whenever the charge on capacitor 182 becomes sufficiently high that the base of transistor 190 goes negative. When transistor 190 conducts, the output of multivibrator 31 is short-circuited, and any pulse appearing at its output when transistor 190 is conducting will not be counted.

The overall operation of the apparatus shown in FIGURE 5 will now be described.

Assuming that transistor 70 is initially in its conducting state, the voltage at junction 64 will be negative with respect to zero. The output voltage of the first integrator, which appears at the collector of transistor 96 increases in a positive direction at a rate which is proportional to the voltage at junction 64. When the voltage at the collector of transistor 96 becomes positive with respect to zero, the output voltage of the second integrator at line 120 begins to decrease, and when it becomes sufficiently negative to overcome the negative limit determined by the minimum detecting circuit, tunnel diode 132, which was initially "off," is turned "on." Transistor 142 receives a more negative signal at its base, and transistor 144 is turned off. Transistor 146, in turn, turns off, while transistor 148 becomes conductive. A positive signal through line 72 turns transistor 68 on while a negative signal through line 74 turns transistor 70 off. The voltage at junction 64 becomes positive with respect to zero, and the output of the first integrator decreases at a rate proportional to the input at the junction 64. The output of the second integrator cannot increase beyond the positive limit voltage due to the clamping effect of zener diode 126. When the output of the first integrator passes zero, the second integrator output starts to decrease, and each of the integrators operates in the opposite direction until the voltage at line 120 reaches a posiive limit, whereupon tunnel diode 132 is turned off causing each of transistors 142, 144, 146, 68 and 70 to return to its original state.

Each time transistor 144 becomes conductive, a positive-going pulse appears in line 146 which triggers the first of flip-flops 30.

If, for example, there are four flip-flops 30, a pulse will appear at the output of multivibrator 31 for every sixteen pulses in line 164. Each output pulse from multivibrator 31 drives counter 34 through the amplifier comprising tarnsistors 166 and 168.

Each time transistor 144 conducts, transistor 148 is cut off delivering a positive pulse to the base of transistor 178 through line 174 and resistor 176. Transistor 178 is caused to conduct, and consequently transistor 180 conducts, thus providing a discharge path for capacitor 182, which was originally charged through resistor 186 and through potentiometer 184 if switch 188 was closed. The charge on capacitor 182 becomes sufficiently high to cause transistor 190 to conduct if it is not discharged by conduction of transistor 180 in a short time. The rate of charging of capacitor 182 is established by adjustment of resistor 184, and it will be apparent that an adjustable minimum will be established with respect to the frequency of the pulses in line 174, which corresponds to the frequency of the polarity reversals. Consequently a minimum is established with rspect to the input signal level at terminals 10 since this corresponds to the pulse frequency. If the frequency of the pulses in line 174 is below the minimum, transistor 190 will be conducting when a pulse appears at the output of multivibrator 31 and consequently the pulse will not be counted. If switch 188 is opened, capacitor 182 will not charge, and the drop out circuit will be rendered inoperative so that no minimum signal level is established.

Resistor 184 adjusts the charging rate of capacitor 182, and consequently adjusts the level at which the dropout circuit operates. For example, if the resistance of 184 is low, capacitor 182 will charge quickly, and transistor 190 will short-circuit the output of multivibrator 31 unless the frequency of the pulses from line 174 is sufficiently high that capacitor 182 will discharge before its charge becomes so high that transistor 190 is allowed to conduct.

The circuit shown in FIGURE 5 can be modified to provide an integrator of the type illustrated in FIGURE 1 by breaking the connection between the collector of transistor 96 and resistor 102 and connecting the collector directly to the base of transistor 122. The connection between the collector 96 and capacitor 100 must also be broken, and capacitor 100 should be connected to the emitters of transistors 122 and 124 at line 120. The second integrator including transistors 104, 106, 108, 110 and 112 can be completely removed from the circuit. In addition, the switching feedback must be reversed by operating transistor 68 from line 74, and transistor 70 from line 72. It will be apparent that the operation of the modified circuit is similar to that of the circuit shown in FIGURE 5, except that only one electrical integration is performed.

In either circuit, a coarse adjustment of the counting rate can be accomplished by choosing the desired number of flip-flops 30. A fine adjustment of the counting rate can be accomplished by adjusting resistor 66, which established the rate at which the integrator output voltage at the collector of transistor 96 changes.

One of the advantages to be obtained with the present invention is that D.C. errors are cancelled to a great degree because the integrators opearte alternately in the positive and negative directions. Another advantage is that the rate of polarity reversal can be made very high so that high resolution can be obtained when the apparatus is used to integrate over a very short period of time. It will be apparent that integration by the method involving reversal of the polarity of the input signal avoids many of the problems involved in integrating devices in which the output of the integrator is reset to zero periodically and the number of times the resetting occurs is counted.

It will be apparent that the present invention can be adapted to receive inputs in various forms by minor modifications, and it will be apparent that the output can be used in many different ways. For example, in processes involving flow, it may be desirable to perform some operation automatically after a certain quantity of fluid has passed through a flowmeter. The output taken from the collector of transistor 168 can be used to drive a predetermining counter which might, for example, close a switch after it receives a certain number of pulses.

Various other applications of the invention will occur to those skilled in the art, and it will be apparent that numerous modifications may be made to the present invention without departing from its scope.

What is claimed is:

1. An apparatus comprising an electrical integrating system receiving an input corresponding to a variable to be integrated, said system including an electrical integrating circuit, means responsive to the output of said integrating circuit for causing said integrating system to operate in a succession of integrating cycles, beginning each new integrating cycle when the output of said integrating circuit reaches a predetermined limit, and counting means responsive to the occurrence of integrating cycles in said integrating system for counting the number of integrating cycles, wherein the improvement comprises means connected to said system and responsive to the frequency of said integrating cycles for disabling said counting means whenever the frequency of said integrating cycles below a predetermined value in order to prevent residual signals at the input of said integrating system from causing operation of said counter when the level of said input is negligible.

2. An integrator according to claim 1 in which said means responsive to the output of said integrating circuit includes polarity reversing means receiving said input, and delivering an output to said electrical integrating circuit, the absolute value of the magnitude of said output being proportional to the magnitude of said input, and means responsive to the output of said integrating circuit for causing said polarity reversing means to reverse the polarity of its output whenever the output of said integrating circuit reaches a predetermined limit.

3. An integrator according to claim 1 wherein said means for disabling said counting means comprises a capacitor, means connected to said capacitor for slowly charging said capacitor, means connected to said capacitor and to said integrating system to cause discharging of said capacitor during alternate integrating cycles and electronic switching means connected to be controlled by the charge on said capacitor and connected to said counting means for preventing said counting means from counting the number of said integrating cycles when the charge on said capacitor exceeds a predetermined level.

4. Apparatus for performing integration and root extraction comprising an electrical integrating system receiving an input corresponding to a variable to be integrated, said system including at least two electrical integrating circuits connected in series, means responsive to the output of the last of said integrating circuits in said series for causing said integrating system to operate in a succession of integrating cycles, beginning each new integrating cycle when the output of the last of the integrating circuits in said series reaches a predetermined limit, and counting means responsive to the occurrence of integrating cycles in said integrating system for counting the number of integrating cycles, wherein the improvement comprises means connected to said system and responsive to the frequency of said integrating cycles for disabling said counting means whenever the frequency of said integrating cycles falls below a predetermined value in order to prevent residual signals at the input of said integrating system from causing operation of said counter when the level of said input is negligible.

5. An apparatus according to claim 4 wherein said means for disabling said counting means comprises a capacitor, means connected to said capacitor for slowly charging said capacitor, means connected to said capacitor and to said integrating system to cause discharging of said capacitor during alternate integrating cycles and electronic switching means connected to be controlled by the charge on said capacitor and connected to said counting means for preventing said counting means from counting the number of said integrating cycles when the charge on said capacitor exceeds a predetermined level.

6. An apparatus for performing simultaneous integration and square root extraction comprising controllable polarity reversing means, said polarity reversing means including means for receiving an electrical input signal and means for delivering a first output signal the absolute value of the magnitude of which is proportional to the magnitude of said input signal, a first electrical integrating means having an input terminal and an output terminal, said input terminal being connected to said means for delivering a first output signal, and said first electrical integrating means delivering to said output terminal a second output signal proportional to the time integral of said first output signal, a second electrical integrating means having an input terminal connected to the output terminal of said first electrical integrating means to receive said second output signal, and said second integrating means having an output terminal and delivering to its output terminal a third output signal, means connected to the output terminal of said second electrical integrating means for preventing the magnitude of said third output signal from exceeding a predetermined maximum limit and falling below a predetermined minimum limit and for producing a control signal when the magnitude of said third output signal reaches either of said predetermined limits, means responsive to said control signal and connected to said controllable polarity reversing means to control said polarity reversing means to reverse the polarity of said first output signal whenever said third output signal reaches one of said limits, and means connected to the foregoing circuitry for counting the number of times said controllable polarity reversing means reverses the polarity of said first output signal.

7. An apparatus according to claim 6 in which said means connected to the output of said second electrical integrating means comprises a pair of Zener diodes arranged in parallel and in opposite directions, a tunnel diode connected in series with said pair of Zener diodes, said third output signal being connected across the series combination of said pair of Zener diodes and said tunnel diode, and including means delivering biasing current to said tunnel diode so that said tunnel diode goes to one of its stable states when one of said Zener diodes conducts and to the other of its stable states when the other of said Zener diodes conducts.

8. An apparatus according to claim 6 in which said controllable polarity reversing means comprises a pair of resistors connected in series and a pair of controllable electronic switching means connected in series, the series combination of said resistors being connected in shunt with the series combination of said controllable electronic switching means, the said means for receiving an electrical input signal comprising the junctions connecting said series combinations in shunt with each other, and the said means for delivering a first output signal comprising the junction of said resistors with each other and the junction of said switching means with each other, and in which said means to reverse the polarity of said first output signal whenever said third output signal reaches one of said limits comprises means connected to control both said controllable electronic switching means for causing said electronic switching means to conduct in the alternative and to alternate whenever said third output signal reaches one of said limits.

9. An apparatus according to claim 6 including means connected to be controlled by said control signal for disabling said counting means when the frequency of the control signals falls below the predetermined value.

References Cited

UNITED STATES PATENTS

| | | | |
|---|---|---|---|
| 3,002,690 | 10/1961 | Meyer | 235—183 |
| 3,020,417 | 2/1962 | Cheilik | 307—247 |
| 3,028,501 | 4/1962 | Lamparter | 235—92 X |
| 3,048,336 | 8/1962 | Ritzenthaler | 235—183 |
| 3,256,426 | 6/1966 | Roth et al. | 235—183 |
| 3,280,313 | 10/1966 | Burk et al. | 235—183 X |
| 3,289,154 | 11/1966 | Cunningham | 235—181 X |
| 3,337,722 | 8/1967 | Siess et al. | 235—92 |

MALCOLM A. MORRISON, Primary Examiner

FELIX D. GRUBER, Assistant Examiner

U.S. Cl. X.R.

235—193.5; 307—228, 229, 233, 237, 247, 261; 328—127, 136, 144; 340—347